United States Patent
Laufer

(10) Patent No.: US 7,982,659 B2
(45) Date of Patent: Jul. 19, 2011

(54) METHOD AND SYSTEM FOR REDUCING LIGHT POLLUTION

(75) Inventor: Eric David Laufer, New York, NY (US)

(73) Assignee: Laufer Wind Group LLC, New York, NY (US)

( * ) Notice: Subject to any disclaimer, the term of this patent is extended or adjusted under 35 U.S.C. 154(b) by 0 days.

(21) Appl. No.: 12/968,046

(22) Filed: Dec. 14, 2010

(65) Prior Publication Data

US 2011/0109491 A1 May 12, 2011

Related U.S. Application Data

(63) Continuation of application No. 12/172,604, filed on Jul. 14, 2008, now Pat. No. 7,876,260.

(60) Provisional application No. 60/950,223, filed on Jul. 17, 2007.

(51) Int. Cl.
*G01S 13/00* (2006.01)
*B64D 47/00* (2006.01)

(52) U.S. Cl. .............. 342/61; 342/29; 340/983

(58) Field of Classification Search .......... 342/29–32, 342/41, 42, 61; 340/945, 947, 948, 961, 340/982, 983
See application file for complete search history.

(56) References Cited

U.S. PATENT DOCUMENTS

| | | | | |
|---|---|---|---|---|
| 2,325,258 A * | 7/1943 | Mallory | ...................... | 340/948 |
| 6,252,525 B1 * | 6/2001 | Philiben | ...................... | 340/961 |
| 6,683,556 B2 * | 1/2004 | Block | ...................... | 342/65 |
| 6,762,695 B1 * | 7/2004 | Eslambolchi et al. | ........ | 340/983 |
| 6,867,710 B2 * | 3/2005 | Wobben | ...................... | 340/963 |
| 6,900,742 B2 * | 5/2005 | Chesney, II | .................. | 340/983 |
| 6,927,701 B2 * | 8/2005 | Schmidt et al. | .............. | 340/959 |
| 6,940,424 B2 * | 9/2005 | Philiben et al. | .............. | 340/945 |
| 7,136,011 B2 * | 11/2006 | Mork et al. | ..................... | 342/29 |
| 7,196,633 B2 * | 3/2007 | Ardelan et al. | ............... | 340/641 |
| 7,355,522 B2 * | 4/2008 | Wobben | .................. | 340/815.45 |

(Continued)

FOREIGN PATENT DOCUMENTS

DE    20 2004 006595    8/2004

(Continued)

OTHER PUBLICATIONS

"The Effect of Windmill Farms on Military Readiness," Office of the Director of Defense Research and Engineering, Washington, D.C., 2006.

(Continued)

*Primary Examiner* — Thomas H Tarcza
*Assistant Examiner* — Peter Bythrow
(74) *Attorney, Agent, or Firm* — Proskauer Rose LLP

(57) ABSTRACT

A system for preventing light pollution includes one or more radar units that monitor for vehicles in a volume surrounding or containing one or more obstructions having one or more obstruction lights. A master radar detection processing unit receives sensed radar detection information from the one or more radar units with associated radar signal processing units and determines whether a vehicle is present within the monitored volume. A plurality of obstruction light controller units are interconnected in a network, such as a wireless network. Each obstruction light controller unit turns on an obstruction light when a vehicle enters the monitored volume or a failure condition exists, and turns off the obstruction light when the vehicle has vacated the monitored volume and no failure condition exists. The one or more radar units can transmit sensed radar detection information to a master radar detection processing unit via the network.

25 Claims, 12 Drawing Sheets

U.S. PATENT DOCUMENTS

| | | | |
|---|---|---|---|
| RE41,153 E * | 3/2010 | Mork et al. | 342/29 |
| 7,710,309 B2 * | 5/2010 | Kao et al. | 342/41 |
| 7,876,260 B2 * | 1/2011 | Laufer | 342/61 |
| 2009/0034259 A1 * | 2/2009 | Laufer | 362/253 |

FOREIGN PATENT DOCUMENTS

| | | |
|---|---|---|
| WO | 2006/092137 | 9/2006 |
| WO | 2007/068254 | 6/2007 |

OTHER PUBLICATIONS

"Service Interim Guidance on Avoiding and Minimizing Wildlife Impacts from Wind Turbines," US Department of the Interior: Fish and Wildlife Service, May 13, 2003.

Buton, T., et al., "Wind Energy Handbook," John Wiley & Sons, Ltd., West Sussex, UK, pp. 538-545 (2001).

Isom, Brad, "Characterization and Mitigation of Wind Turbine Clutter for the WSR-88D Radar Network," MS Thesis Submitted to the University of Oklahoma (2007).

Perry, James and Biss, Andrew, "Wind Farm Clutter Mitigation in Air Surveillance Radar," IEEE Aerospace Electronic Systems Magazine., pp. 35-40 (2007).

Zhang, Y., et al., "Wireless Mesh Networking," Auerbach Publishing, Boca Raton, FL, pp. 4-7 (2007).

Memorandum from Global Strategy Group to the Yale Center for Environmental Law & Policy regarding the Yale 2007 Environmental Survey—Key Findings, Mar. 7, 2007.

Notification of Transmittal of the International Search Report and the Written Opinion, dated Nov. 20, 2008 (17 pages total).

* cited by examiner

METHOD AND SYSTEM FOR REDUCING LIGHT POLLUTION

CROSS-REFERENCES TO RELATED APPLICATIONS

This application is a continuation of, claims the benefit of, and priority to U.S. Ser. No. 12/172,604, filed on Jul. 14, 2008, titled, "Method and System for Reducing Light Pollution," which claims the benefit of U.S. Provisional Patent Application Ser. No. 60/950,223, filed on Jul. 17, 2007, the entire contents of which are incorporated herein by reference.

FIELD OF THE INVENTION

In general, the invention relates to systems and methods for reducing light pollution. In particular, the invention relates to systems and methods for controlling warning lights on obstructions, such as wind turbines, to reduce light pollution.

BACKGROUND

Light pollution (also known as photo-pollution or luminous pollution) refers to light that is annoying, wasteful or harmful. Like other forms of pollution (e.g., air pollution, noise pollution, water pollution, soil contamination), light pollution can harm the environment and human and animal health.

Light pollution is a broad term that refers to multiple problems, which are caused by inefficient, annoying or arguably unnecessary use of artificial light. Specific categories of light pollution include light trespass, over-illumination, glare, clutter, and sky glow. Often annoying or wasteful light fits several of these categories.

Light trespass occurs when unwanted light enters one's property, for instance, by shining light over a neighbor's fence. Often, light trespass occurs when strong light enters through the window of one's home. The strong light may cause problems such as sleep deprivation or the blocking of an evening view.

Light is particularly problematic for astronomers. Stray light may limit an astronomer's ability to observe the night sky. For this reason, most major optical astronomical observatories are surrounded by zones of strictly-enforced restrictions on light emissions.

A number of cities in the United States have developed standards for outdoor lighting to protect the rights of its citizens. The International Dark-Sky Association has developed a set of model lighting ordinances. U.S. federal agencies also promulgate and enforce standards and process complaints within their areas of jurisdiction. For instance, the FAA promulgates and enforces lighting requirements for white strobe lights on communication towers. The FCC maintains a database of Antenna Structure Registration information, which citizens may use to identify offending structures. The FCC also provides a mechanism for processing consumer inquiries and complaints.

The U.S. consumes energy that is equivalent to 50 million barrels per day of petroleum. The U.S. Department of Energy notes that 60% of that energy comes from nuclear power, natural gas, hydroelectric and other non-petroleum sources. The U.S. Department of Energy further notes that over 30% of all energy consumed in the U.S. is consumed by commercial, industrial, and residential sectors. Energy audits of existing buildings demonstrate that lights in residential, commercial, and industrial buildings consume about 20 to 40% of all energy consumed in the U.S. Thus, lighting energy accounts for the equivalent of about four or five million barrels of oil per day. Energy audit data demonstrates that about 30 to 60% of energy consumed in lighting is unneeded or gratuitous. Indeed, over-illumination (i.e., the excessive use of light) wastes energy equivalent to two million barrels of petroleum per day.

SUMMARY OF THE INVENTION

The invention, in one aspect, features a system for preventing light pollution. The system includes a radar unit configured to monitor a volume surrounding or containing at least one obstruction. The at least one obstruction has a plurality of obstruction lights. The system also includes a master radar detection processing unit in communication with the radar unit. The master radar detection processing unit is configured to process radar detection information from the radar unit and to determine whether a vehicle is present in the monitored volume. The master radar detection processing unit is further configured to generate control signals based on the processed radar detection information. The system also includes a plurality of obstruction light controller units. The master radar detection processing unit is further configured to transmit the control signals over a network of obstruction light controller units. Each obstruction light controller unit is configured to operate an obstruction light based on the control signals.

In some embodiments, each obstruction light controller unit is configured (i) to turn on an obstruction light if the control signals indicate that the vehicle has entered the monitored volume or a failure condition has occurred and (ii) to turn off the obstruction light if the control signals indicate that the vehicle has left the monitored volume and the failure condition has not occurred.

In other embodiments, the system further includes a second radar unit in communication with the master radar detection processing unit via the network of obstruction light controller units. The second radar unit is configured to transmit radar detection information to the master radar detection processing unit via the network.

In some embodiments, the vehicle is an airborne vehicle and the master radar detection processing unit receives radar detection information from the radar unit; a presence, a range, an azimuth, and an elevation angle of the airborne vehicle are determined. The master radar detection processing unit can differentiate between airborne vehicles and ground vehicles. The airborne vehicle can include a small plane, a large plane, a helicopter, or a glider.

In various embodiments, the at least one obstruction includes a windmill, a wind turbine, or a tower. In some embodiments, the master radar detection processing unit differentiates the vehicle from the motion of the wind turbine rotors and the variable yaw orientation of the wind turbine nacelles.

In some embodiments, the network of obstruction light controller units is a wireless network. In other embodiments, the radar unit is located in close proximity to the monitored volume. In yet other embodiments, the at least one radar unit is located remotely from the monitored volume.

In some embodiments, the master radar detection processing unit counts the number of vehicles entering and vacating the monitored volume and transmits a control message to the plurality of obstruction light controller units to turn on the plurality of obstruction lights in response to the master radar detection processing unit determining that the number of vehicles that have entered and have vacated the monitored volume is not equal.

In some embodiments, the master radar detection processing unit monitors the operational status of the radar unit. In one embodiment, the radar unit is mounted on a wind turbine.

In another aspect, the invention features an obstruction light controller unit for preventing light pollution. The obstruction light controller unit includes a communications unit configured to receive control signals from a master radar detection processing unit via a network of obstruction light controller units. The master radar detection processing unit generates the control signals based on radar detection information from at least one radar unit. The at least one radar unit monitors a volume surrounding or containing at least one obstruction. The at least one obstruction has a plurality of obstruction lights.

The obstruction light controller unit also includes a processing unit configured to interpret control signals indicating whether a vehicle is present in the monitored volume. The processing unit is further configured to interpret control signals indicating whether a failure condition has occurred. The obstruction light controller unit also includes a switching unit. The switching unit is configured to turn on an obstruction light in response to the processing unit determining that at least one vehicle has entered the monitored volume or that a failure condition has occurred. The switching unit is also configured to turn off the obstruction light in response to the processing unit determining that all vehicles have vacated the monitored volume and the failure condition has not occurred.

In some embodiments, the communications unit is a wireless communications unit that includes an antenna. In other embodiments, the switching unit is a normally closed (NC) relay or a single-pole-double-throw (SPDT) relay with normally closed leads.

In another aspect, the invention features a method for preventing light pollution. The method includes monitoring for vehicles in a volume surrounding or containing at least one obstruction. The at least one obstruction has at least one obstruction light. The method also includes determining whether at least one vehicle is present within the monitored volume. The method further includes determining whether a failure condition exists. The method further includes turning on the at least one obstruction light in response to determining that at least one vehicle is present within the monitored volume or a failure condition exists.

In some embodiments, the method for preventing light pollution further includes turning off the at least one obstruction light in response to determining that (i) at least one vehicle is not present in the monitored volume and (ii) a failure condition does not exist. Determining whether a failure condition exists can include monitoring, within a regular time interval, for a predetermined signal indicating whether elements of a system for preventing light pollution are properly functioning. The method can also include turning on the at least one obstruction light in response to not detecting, within a regular time interval, a predetermined signal that indicates that elements of the system for preventing light pollution are properly functioning. The method can further include turning on the at least one obstruction light in response to detecting a predetermined signal indicating that elements of the system for preventing light pollution are not properly functioning.

The details of one or more examples are set forth in the accompanying drawings and description. Further features, aspects, and advantages of the invention will become apparent from the description, the drawings, and the claims.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The United States imports vast quantities of oil to satisfy its energy needs. Every megawatt of energy produced by alternative energy sources is one less megawatt that needs to be produced from imported oil, which leads directly to increased energy independence.

In the United States, 21 states and the District of Columbia currently have Renewable Portfolio Standards (RPSs). RPSs are legislatively mandated requirements that a certain percentage of energy must be produced from renewable sources, such as wind. The specific requirements vary from state to state. The U.S. Congress is currently considering a national RPS.

Figure 1:
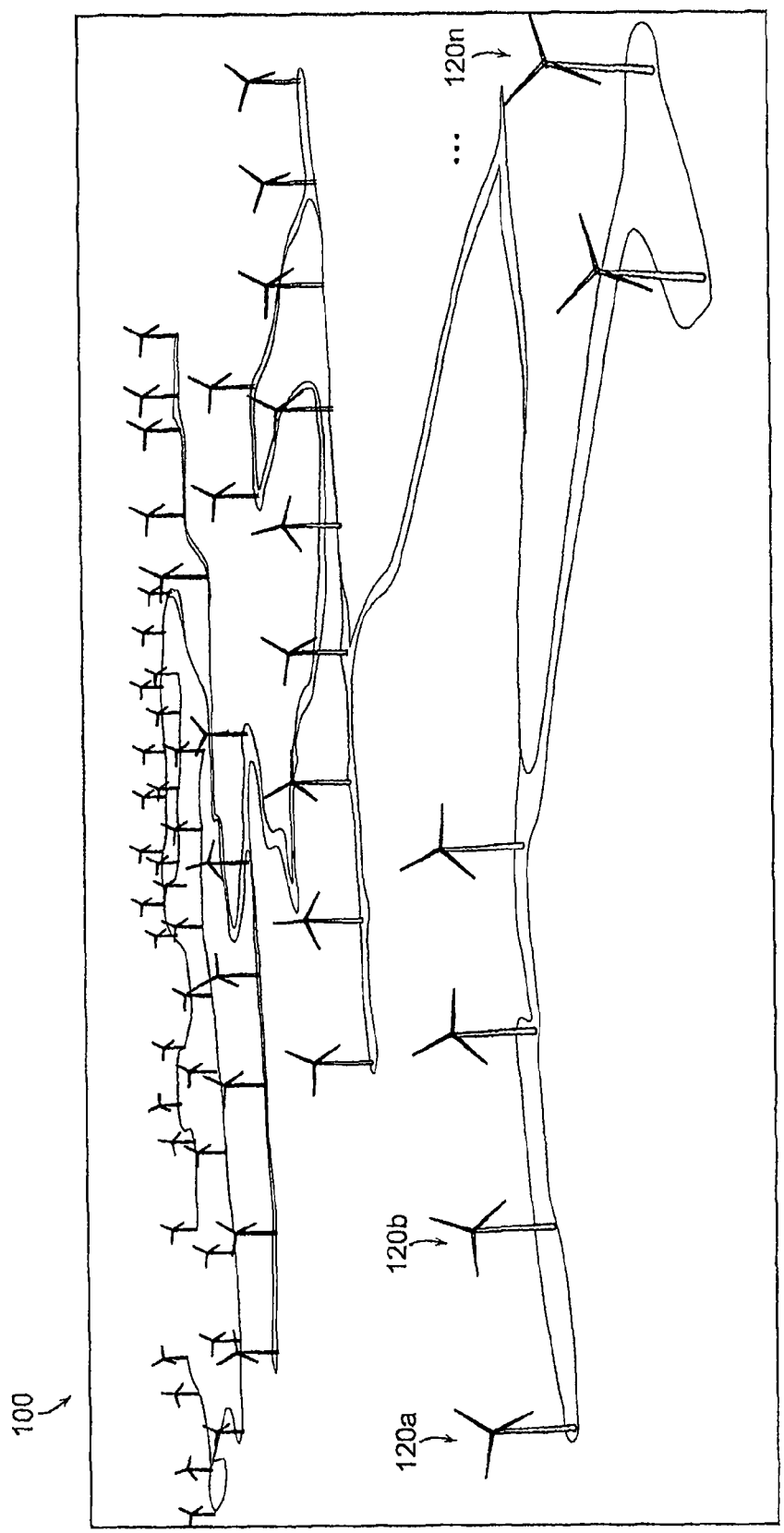
FIG. 1 is an embodiment of a wind farm.

As shown in FIG. 1, wind power plants or wind farms 100 comprised of wind turbines 120a-120n (generally, 120) are being developed throughout the United States to meet the RPSs. Wind farming is considered to be one of the cleanest methods of producing energy on an industrial scale. A single wind farm can produce hundreds of megawatts of energy without producing appreciable amounts of greenhouse gasses, like $CO_2$, which cause global warming. The U.S. Department of Energy reports that, as of March 2004, wind power plants are operating in 32 states. Government experts hope wind will provide 6% of the nation's electricity by the year 2020.

The Federal Aviation Administration (FAA) requires that all structures that "may affect the National Airspace System" be appropriately marked via paint and lighting schemes so that they are visually conspicuous to pilots of airborne vehicles. Although many currently installed wind turbines are not required to be lit with lights, the current and expected future generations of megawatt class wind turbines are sufficiently tall that they are considered to be obstructions in the national airspace.

Figure 2:
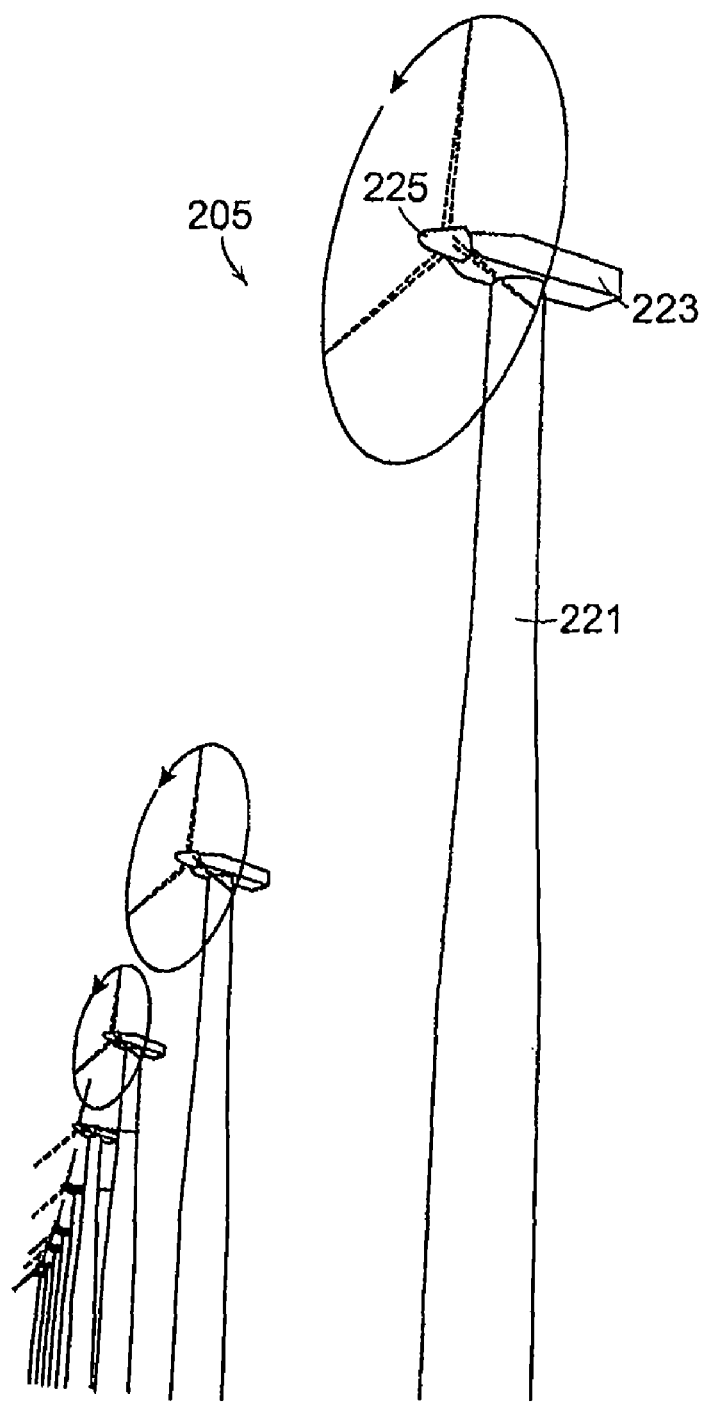
FIG. 2 is a perspective view of an embodiment of a wind turbine.

FIG. 2 is one embodiment of a wind turbine 205. The wind turbine 205 includes a tower 221, a nacelle 223 mounted atop the tower 221, and a rotor 225 coupled to the nacelle 223. The nacelle 223 typically includes a gearbox, a generator, a yaw motor, a controller, and other components for operating the wind turbine 205. As illustrated in FIG. 2, current and future generations of wind turbines reach great heights to gain access to unobstructed wind. Wind turbines in wind farms generally stand between 300 to 400 feet high and wind farms can include more than 200 wind turbines on stretches of land reaching for miles (See FIG. 1). Because of these heights, the Federal Aviation Administration (FAA) requires that wind turbines be marked with obstruction lights to prevent collisions between airborne vehicles and wind turbines. In general, the FAA regulations require that airborne vehicle warning lights be installed on all towers taller than 200 feet. The FAA proscribes the various obstruction lighting schemes required for wind farms in its advisory circular AC 70/7460-1K, Obstruction Marking and Lighting, the entirety of which is incorporate herein by reference.

In general, the FAA guidelines advise that a single flashing red obstruction light be placed on selected turbine nacelles such that the perimeter of the wind farm is defined by the obstruction lights. The FAA guidelines also advise that no more than one-half statute mile exist between turbines with obstruction lights. The FAA guidelines also require the obstruction lights to flash synchronously. The FAA evaluates proposed lighting schemes for planned wind farms on a case-by-case basis. It then makes recommendations for modifications until either it is satisfied or it deems the proposed location or layout of the wind farm unacceptable under any and all obstruction light schemes.

One of the main impediments to wind energy development in the United States can be summed up in one word: "NIMBYism." NIMBY is an acronym for Not In My Back Yard. It is the phenomenon of supporting something in the abstract, but opposing it if it negatively affects you personally. The 2007 Environment Survey from the Yale Center for Environmental Law and Policy found that 90% of Americans support an increase in wind energy. However, convincing local communities to accept the impact of utility scale wind farms in their midst remains a constant challenge to developers. Approval rests on complicated negotiations, potentially involving dozens of land owners and multiple town boards. Success can often be derailed by a vocal minority.

Although people find many reasons to object to a wind farm proposal, the dominant objection is usually to the negative visual impact. Ideal locations for wind farms are often found to be in rural areas. Residents of the towns that are in and around proposed wind farm sites often object to the visual impact of large numbers of bright flashing obstruction lights, which intrude on the rural character of their communities. Wind farm opponents have claimed that the visual impact decreases property values and ruins the historical and the cultural character of their communities. Local town boards must approve a proposal for a wind farm before it is implemented. One may personally agree or disagree with the relative merits of these arguments as compared to the benefits of increased wind energy development, but they undeniably hold sway in town board meetings. Indeed, they can delay or permanently derail wind energy projects.

The current debate surrounding a proposed wind farm in upstate New York is a typical example. Community Energy, a wind farm developer, is attempting to develop a 130-150 MW wind farm with 68 turbines in and around Jordanville, N.Y. A substantial amount of money will be paid to the land owners, the county governments, the town governments, and the local school districts where the wind turbines will be placed. There are communities, however, that will not directly benefit financially from the wind farms, but will be able to see the obstruction lights. Residents of nearby Cooperstown, N.Y. have organized a group called Otsego 2000, which is putting forth a strong effort to thwart the project. Cooperstown is over ten miles from the proposed site and will not directly benefit from any of the financial incentives offered to the communities in which the wind turbines will be placed. Cooperstown residents, however, will be able to see the FAA obstruction lights mounted atop many of the wind turbines.

Otsego 2000 is currently supporting litigation that successfully stopped the development of this wind farm from moving forward and possibly permanently prevented it from being constructed. Embodiments of a Radar Solution to Light Pollution (RSLP) system according to the invention mitigate the impact of obstruction lights and, therefore, address the principle objections to wind farms.

Another commonly expressed objection to wind farms is that wind turbines kill birds. The presence of obstruction lights is thought to be a major contributing factor to bird deaths. Birds are drawn towards these lights at night, possibly mistaking them for stars, and then are killed by the rotating turbine blades. If obstruction lights were turned on for a smaller percentage of time, bird deaths from turbine strikes might be reduced.

Embodiments of the RSLP system balance the FAA's obstruction light requirements and the nuisance of light to the residents who live near existing or proposed wind farms, while leading toward preventing global warming and energy independence. In some embodiments, the RSLP system includes a radar unit that scans for airborne vehicles in a specified volume surrounding a wind farm or tower. When one or more airborne vehicles are detected within the specified volume, obstruction lights on wind turbines in the wind farm are turned on. When all airborne vehicles vacate the specified volume, the obstruction lights are turned off. Though some embodiments of the RSLP system are designed for wind farms, other embodiments are designed for all towers for which the FAA requires obstruction lights.

Though highly mounted bright lights provide the necessary protection against collisions between airborne vehicles and obstructions, they are viewed as a nuisance and a form of pollution to residents who live nearby. Currently, these lights are kept turned on, irrespective of the presence of an airborne vehicle in the vicinity. The RSLP provides a superior balance between the competing needs of the FAA and local residents by turning on obstruction lights only when an airborne vehicle is near the obstructions having the obstruction lights.

In some embodiments, the RSLP system includes software and hardware components that interface with a radar system, such as a Perimeter Surveillance Radar (PSR) system. The radar system can scan a volume surrounding or containing a wind farm or a tower. When the radar system detects an airborne vehicle within a predetermined distance from the wind farm, the RSLP system turns on the obstruction lights associated with the wind farm or the tower. When the radar system does not detect an airborne vehicle within a predetermined distance from the wind farm, the RSLP system turns off the obstruction lights.

Embodiments of the RSLP system can also be applied to wind farms located in a body of water, such as a lake or an ocean. Obstruction lights can be mounted at an appropriate position on wind turbines to warn water vehicles of the presence of wind turbines in the same way that a lighthouse warns water vehicles of the presence of land or shallow water. The master radar detection processing unit can be configured to turn on obstruction lights positioned atop wind turbines in response to detecting an airborne vehicle within a predetermined volume and to turn on obstruction lights positioned on the wind turbines near the surface of the water in response to detecting water vehicles within a predetermined area of water.

Figure 3:
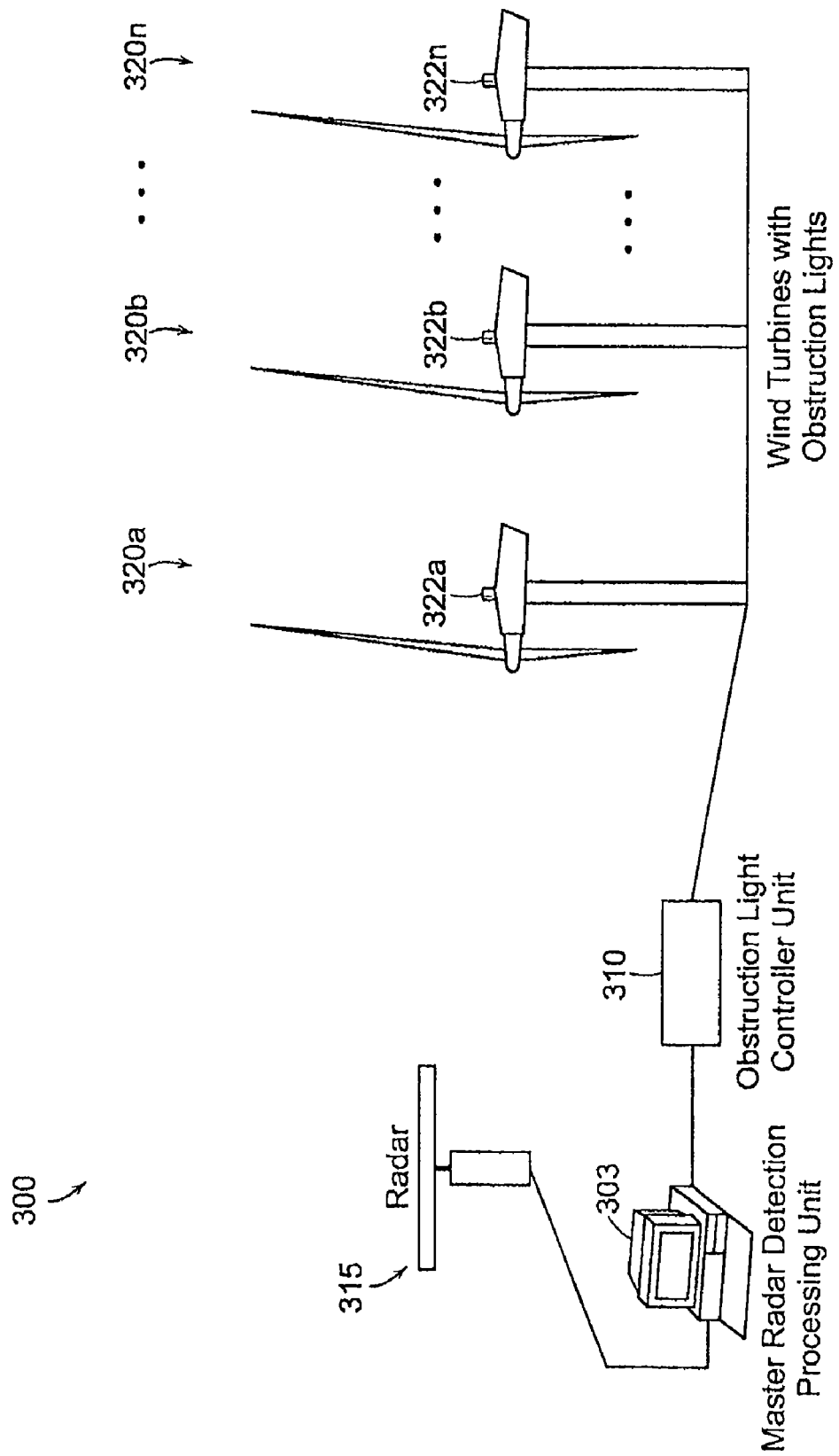
FIG. 3 is a block diagram of a Radar Solution to Light Pollution (RSLP) system, according to an illustrative embodiment of the invention.

FIG. 3 is a block diagram of a Radar Solution to Light Pollution (RSLP) system 300, according to one embodiment of the invention. The RSLP system 300 includes an obstruction light controller unit 310, which can be a standalone unit including an onboard processor and electronics. The RSLP system 300 also includes a master radar detection processing unit 303 executing RSLP system software code. The RSLP system 300 further includes a perimeter surveillance radar unit 315 that interfaces with the master radar detection processing unit 303. The master radar detection processing unit 303 uses radar detection information from the radar unit 315 to control the obstruction lights 322a-322n (generally, 322) on wind turbines 320a-320n (generally, 320) of a wind farm via the obstruction light controller unit 310. The obstruction lights 322 can mount on other types of obstructions, including radio towers and water towers. The RSLP system 300 can be a stand-alone system for a wind farm or tower. Also, the RSLP system 300 can be incorporated into the obstruction lighting system of a wind farm or tower (as described below), incorporated into an airborne or water vehicle's radar system, or incorporated into the FAA's air traffic control system.

The radar unit 315 can be an imaging-type, pulse Doppler, moving-target indicator, moving-target detector or other type of radar unit that can scan a search volume or range-azimuth grid with radar signals. The radar unit 315 can also be configured to perform raster scans to determine target elevation. The radar unit 315 can also have a stacked beam configuration to determine target elevation. The radar signals are reflected off objects within the volume and received at the radar unit 315. These objects can include human personnel, vehicles, buildings, watercraft, and the like. The radar unit 315 can include a radar signal processing unit that processes the radar return signals and generates target detection information including presence, range, azimuth, velocity, and altitude of an airborne vehicle. In some embodiments, the master radar detection processing unit 303 can process radar returns into target detection information.

The master radar detection processing unit 303 can reliably differentiate airborne vehicles from ground vehicles and can reliably differentiate all vehicles from non-vehicles and clutter, such as a flock of birds. That is, the RSLP system can have sufficient target recognition capabilities to determine if one or more airborne vehicles are present in the monitored volume. If airborne vehicles are detected within a predetermined volume surrounding or containing the wind farm, the master radar detection processing unit 303 running the RSLP software sends a control signal to the obstruction light controller unit 310 to turn on the obstruction lights 322. If no airborne vehicles are detected within the predetermined volume, the master radar detection processing unit 303 running the RSLP software sends a control signal to the obstruction light controller unit 310 to turn off the obstruction lights 322.

Figure 4:
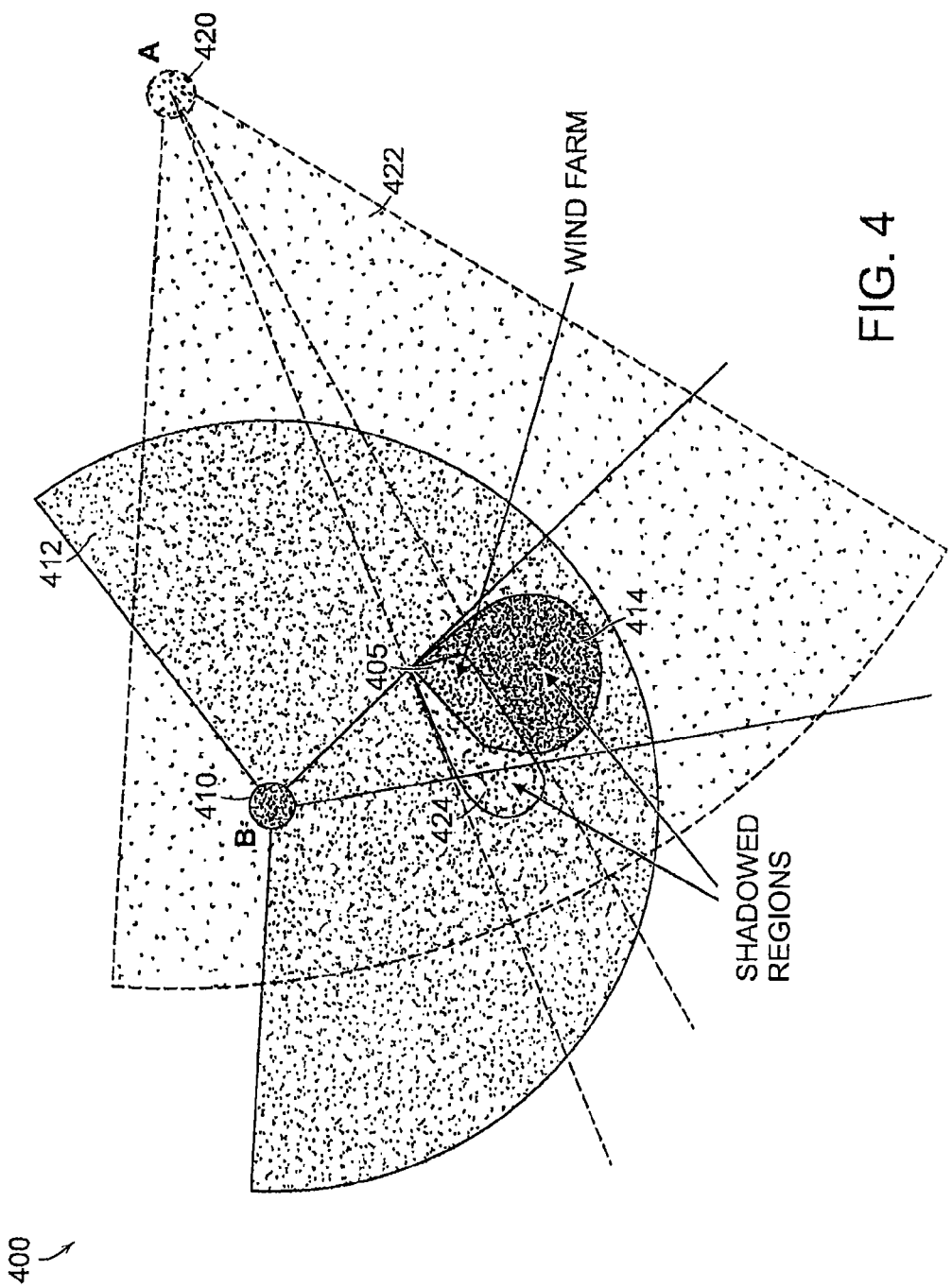
FIG. 4 is a block diagram of a radar unit configuration for an RSLP system, according to an illustrative embodiment of the invention.

In certain applications, the single radar unit 315 cannot detect a vehicle that moves behind a large obstruction or group of obstructions. For example, as illustrated in FIG. 4, the wind farm 405 creates a shadow region 424 because the wind farm 405 interferes with a portion of the radar beam 422 emitted from radar unit A 420. Consequently, radar unit A 420 will fail to detect an airborne vehicle or other vehicle that moves into shadow region 424. The wind farm 405 also creates a shadow region 414 because the wind farm 405 interferes with a portion of the radar beam 412 emitted from radar unit B 410. As a result, radar unit B 410 will fail to detect an airborne vehicle located in shadow region 414.

To correct this problem, some embodiments of the RSLP system employ two or more radar units, which are positioned so that the shadow regions associated with each radar unit are monitored by another radar unit. For example, as illustrated in FIG. 4, radar unit A 420 monitors the shadow region 414 associated with radar unit B 410 and radar unit B 410 monitors the shadow region 424 associated with radar unit A 420.

Figure 5:
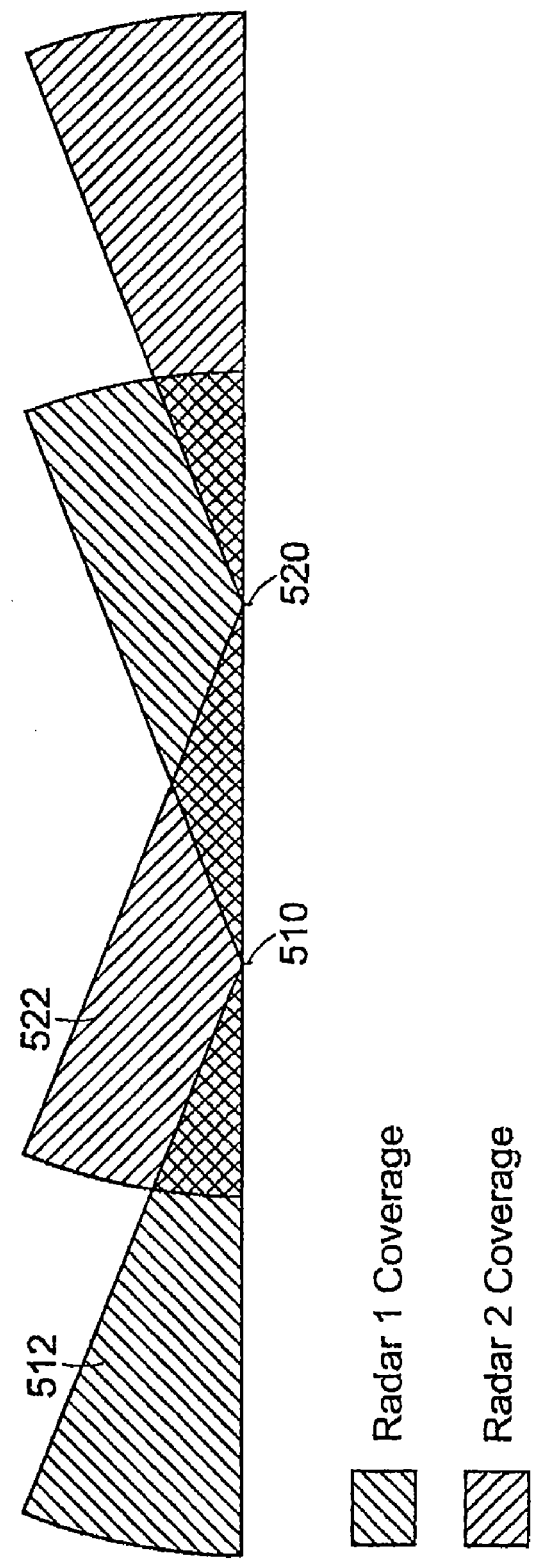
FIG. 5 is a block diagram of a radar unit configuration for an RSLP system, according to another illustrative embodiment of the invention.

As shown in FIG. 5, in some embodiments, radar beam 512 spreads out from a radar unit 510 at a given angle in the vertical direction so that it is not able to track airborne vehicles in the volume above the radar unit 510. To correct this problem, a second radar unit 520 may be positioned where the radar beam 522 emitted from the radar unit 520 may monitor the volume above the radar unit 510.

Figure 6:
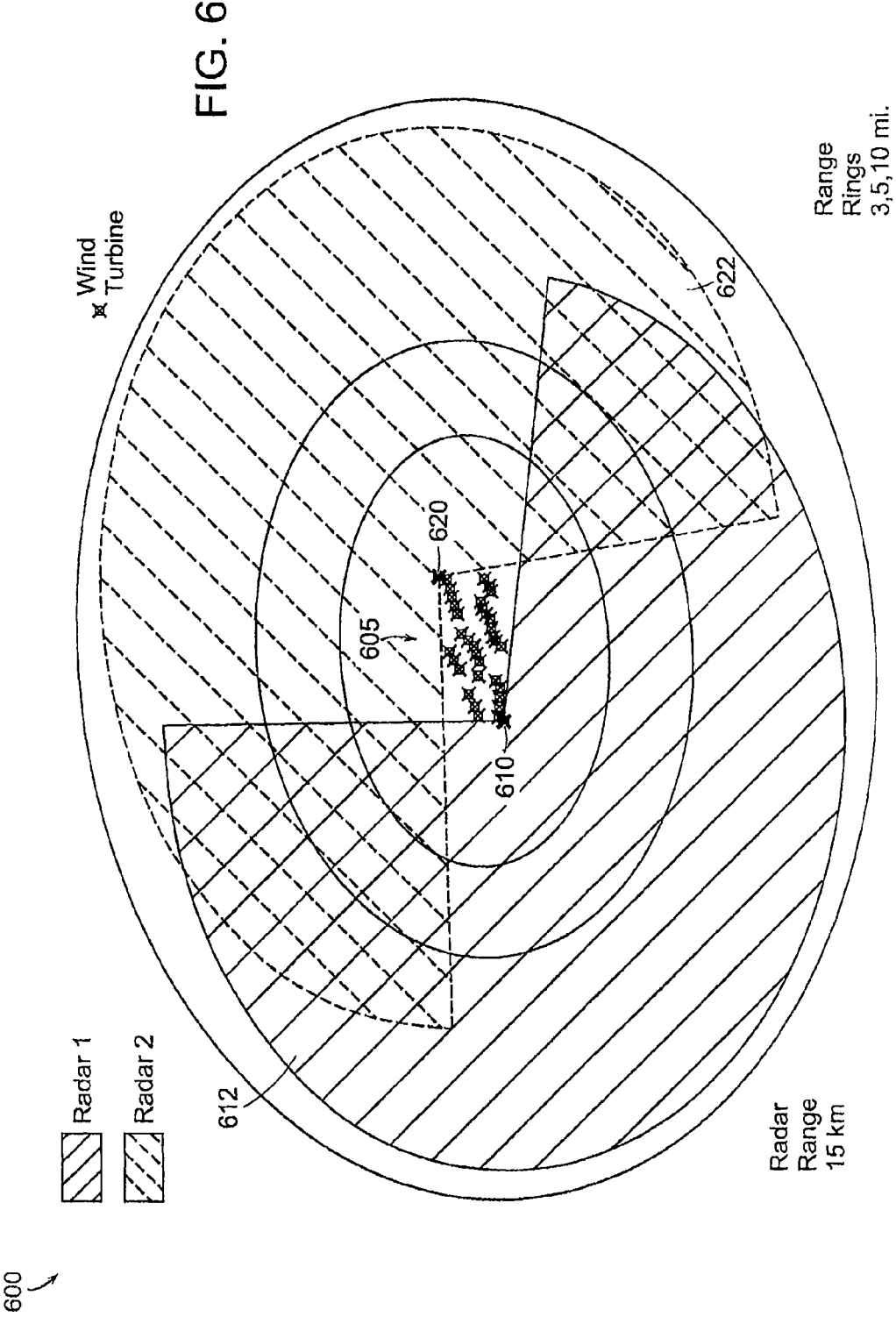
FIG. 6 is a block diagram of a radar unit configuration for an RSLP system, according to another illustrative embodiment of the invention.

FIG. 6 is a block diagram of a radar unit configuration 600 for an RSLP system, according to another illustrative embodiment of the invention. Radar units 610, 620 are positioned on opposite sides of a wind farm 605. Radar beam 622 emitted from radar unit 620 sweeps an area that does not include the wind turbines in the wind farm 605. Likewise, radar beam 612 emitted from radar unit 610 sweeps an area that does not include the wind turbines in the wind farm 605.

The number and placement of radar units depends on the specific configuration and characteristics of the wind farm or other obstructions and the local topography. In some embodiments, the radar units are mounted on towers surrounding the wind farm. In other embodiments, multiple radar units are mounted on wind turbine nacelles, wind farm meteorological towers, nearby radio towers, or on an obstruction. The location and height of the radar units may also depend on the size and shape of the volume in which pilots of airborne vehicles can see the obstruction lights.

The RSLP software may use a variety of filtering and interference suppression techniques where appropriate to minimize the radar interference caused by the wind turbines themselves, thereby increasing overall detection performance and minimizing false alarms. Site-specific filters for each wind farm may be used to suppress radar returns in the range-Doppler domain according to functions derived from curves fitted to empirical data collected from wind turbine radar interference at those sites. Range-azimuth gating may also be employed. The radar search grid is comprised of cells defined by the radar's resolution in range and azimuth. A wind turbine's location is fixed. A wind turbine may cause sufficient interference in its associated range-azimuth cell such that reliable detection of other targets in that cell is impossible. The cell or cells containing the wind turbines may be gated or ignored to increase overall detection performance.

In some embodiments, a radar unit and a digital compass are mounted on the wind turbine nacelle. The master radar detection processing unit 303 may process data from the radar unit and the digital compass to compensate for the yawing motion of the wind turbines into the direction of the wind.

Figure 7A:
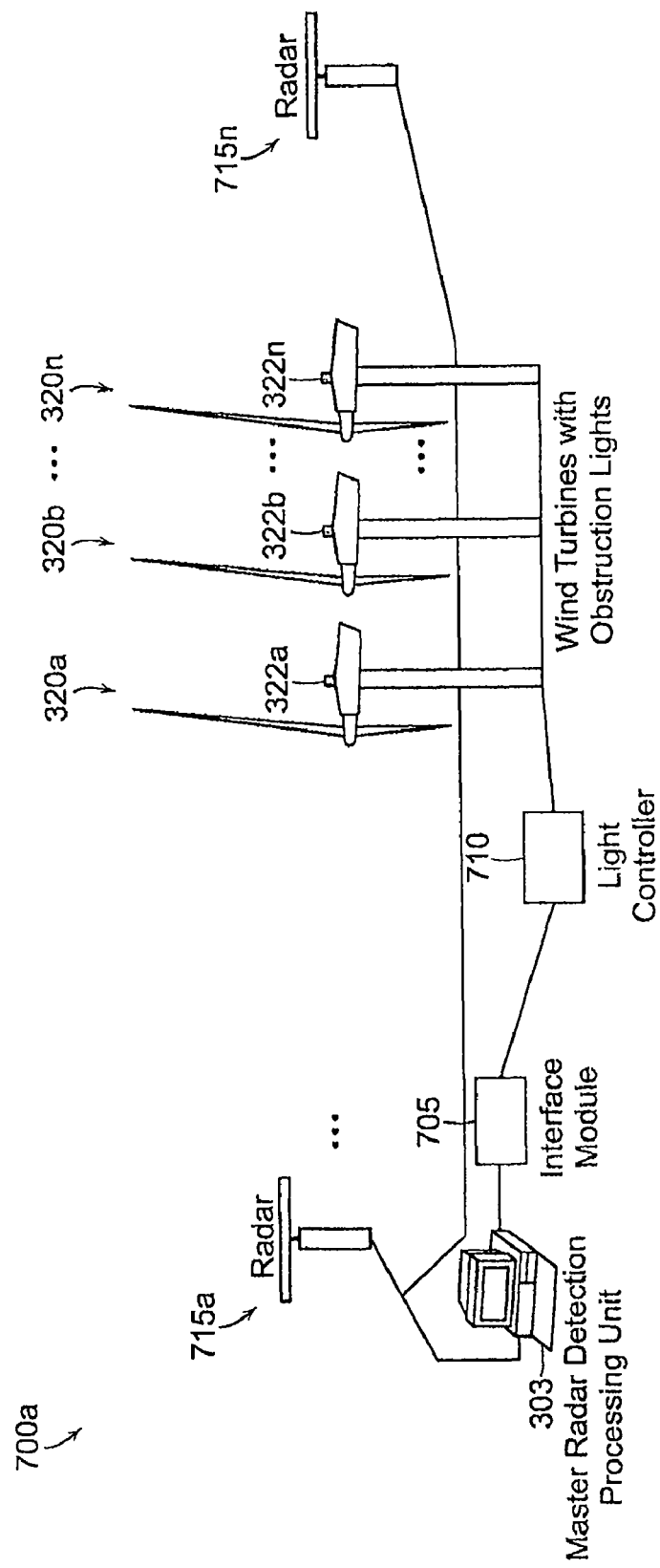
FIG. 7A is a block diagram of an RSLP system used in conjunction with a pre-existing light controller, according to an illustrative embodiment of the invention.

FIG. 7A is a block diagram 700a of an RSLP system used in conjunction with a light controller 710, according to an illustrative embodiment of the invention. In many existing wind farms, the light controller 710 controls the obstruction lights 322 on the wind turbines 320. The light controller 710 can perform a variety of functions. In one embodiment, the light controller 710 turns the obstruction lights on or off based on the ambient light level sensed by a photocell mounted on the light controller 710. In some embodiments, the light controller 710 generates a signal that causes the obstruction lights to flash synchronously or according to another predetermined pattern.

The RSLP system used in conjunction with the light controller 710 includes a master radar detection processing unit 303 running RSLP system software code and an interface module 705 coupled between the master radar detection processing unit 303 and the light controller 710. The RSLP system also includes multiple radar units 715a-715n (generally, 715) to avoid the problems associated with using a single radar unit, as described above. The master radar detection processing unit 303 is coupled to the radar units 715. Each radar unit 715 contains its own radar signal processing unit for generating radar detection information. The master radar detection processing unit 303 analyzes the radar detection information to determine how to control the obstruction lights 322 using the light controller 710. The master radar detection processing unit 303 then transmits control signals to the light controller 710 via the interface module 705 to control the obstruction lights 322.

In some embodiments, the light controller 710 can accept control signals from the interface module 705 or other external circuitry to provide additional logic to control the obstruction lights 322 in a particular way. In some embodiments, the interface module 705, the master radar detection processing unit 303, and/or the external circuitry send signals at regular time intervals to indicate that they are working properly.

Figure 7B:
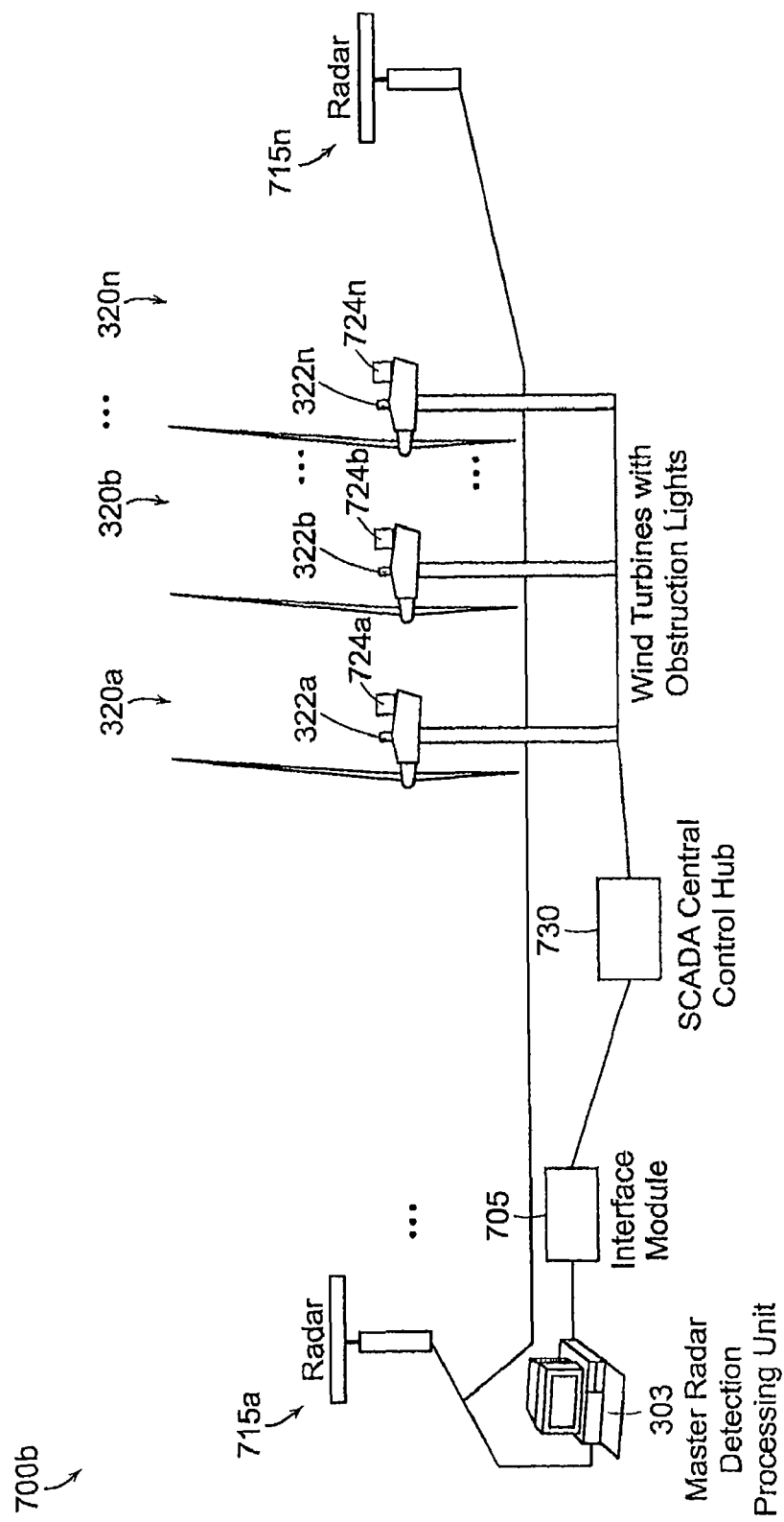
FIG. 7B is a block diagram of an RSLP system used in conjunction with a Supervisory Control and Data Acquisition (SCADA) system, according to another illustrative embodiment of the invention.

FIG. 7B is a block diagram of an RSLP system used in conjunction with a Supervisory Control and Data Acquisition (SCADA) system, according to another illustrative embodiment of the invention. Some wind farms contain a Supervisory Control and Data Acquisition (SCADA) system, which includes a Central Control Hub 730. The SCADA Central Control Hub 730 is the central location from which all the wind turbines of a wind farm are monitored and controlled.

The RSLP system 700 includes a master radar detection processing unit 303 running RSLP system software code and an interface module 705 coupled between the master radar detection processing unit 303 and the SCADA Central Control Hub 730. The RSLP system 700 also includes multiple obstruction light controller units 724a-724n (generally, 724) coupled to the SCADA Central Control Hub 730. Each obstruction light controller unit 724 is also coupled to an obstruction light 322. The master radar detection processing unit 303 interfaces with the radar units 715. Each radar unit 715 contains its own radar signal processing unit for generating radar detection information. The master radar detection processing unit 303 analyzes the radar detection information to determine how to control each obstruction light 322a-322n on each wind turbine 320a-320n. The master radar detection processing unit 303 then transmits control signals to the multiple obstruction light controller units 724a-724n via the interface module 705 and the SCADA Central Control Hub 730.

Embodiments of the master radar detection processing unit 303 running the RSLP system software code can perform any one of or any combination of the following functions:

1. Coordinate the multiple radar units 715. The master radar detection processing unit 303 turns on the radar units 715 when night falls and turns off the radar units 715 when morning breaks. It also controls the volume, in terms of latitude, longitude and elevation, that each of the units continuously scans when in operation.
2. Find and track target vehicles (e.g., airborne vehicles). The radar units 715 can simultaneously track multiple vehicles. The master radar detection processing unit 303 can associate the different detection tracks from the radar units 715 to the common target vehicle to which the detection tracks refer.
3. Filter out non-target moving objects (e.g., cars, trucks, boats, people, and birds). The radar units 715 can detect all moving objects. The master radar detection processing unit 303 analyzes radar returns and detection information from the radar units 715 to determine whether a moving object is a target. The radar returns and detection information from the radar units 715 can include elevation angle, modulations from the propellers on an airborne vehicle, speed, path of travel, and correlation with information from the FAA. If the master radar detection processing unit 303 determines that the moving object is not a target, the moving object can be ignored.
4. Filter out wind turbines 320. The master radar detection processing unit 303 performs range and azimuth gating to ignore the radar returns associated with the wind turbines 320. Because the wind turbines 320 are in fixed locations, the radar returns from those locations can be ignored.
5. Perform "Control Volume" analysis. The monitored volume may include a defined airspace based on FAA obstruction light specifications and any other applicable specifications. This three-dimensional shape is referred to as a control volume because every airborne vehicle that enters the defined airspace will, in general, eventually leave that airspace, analogous to the flow of fluids in Control Volume analysis in fluid mechanics. The control volume can be the volume being scanned by the radar system or a portion of the scanned volume. The master radar detection processing unit 303 monitors the entrances and exits of airborne vehicles into and out of the control volume. In some embodiments, the master radar detection processing unit 303 keeps running tallies of the entrances and exits of airborne vehicles. The obstruction lights 322 are turned on when one or more airborne vehicles enters the control volume. The obstruction lights 322 are turned off only when the number of airborne vehicles that have exited the control volume are equal to the number of airborne vehicles that have entered the control volume. This method allows for an additional level of safety if the tracks from one or more airborne vehicles are lost over the wind turbines 320, if the airborne vehicle flies into a range-azimuth-gated cell, or if the airborne vehicle flies close to or in between the wind turbines 320 at a low altitude.
6. Determine when to turn the obstruction lights 322 on or off. The master radar detection processing unit 303 processes the information from the control volume analysis and determines when to turn the lights on or off.
7. Monitor the operational status of the radar units 715.
8. Generate control messages for the obstruction light controller units 724. For example, the master radar detection processing unit 303 can generate control messages for the obstruction light controller units 724 indicating whether an airborne vehicle is present within a predetermined volume surrounding or containing a wind farm (e.g., an AircraftPresent signal indicating that an aircraft is present in the predetermined volume or an Aircraft-NotPresent signal indicating that an aircraft is not present in the predetermined volume). In one embodiment, the master radar detection processing unit 303 running the RSLP software code generates and transmits control messages to the obstruction light controller units 724 indicating the operational status of the radar units 715.

In some embodiments, the radar signal processing unit of a particular radar unit (e.g., radar unit 715a) acts as the master radar detection processing unit 303 and executes the RSLP system software. For example, the RSLP system may employ a radar system developed by Detection Monitoring Technologies (DMT) (Sterling, Va.). The standard configuration of DMT's system has two main components: the radar server and the client software. In DMT parlance, the radar server refers to the actual radar unit and an onboard computer, which runs Windows®, and a software application, which processes the radar returns to create target detection data. This onboard computer is referred to as the server because the detection data can be accessed remotely by other computers running the client software. The client software is the user interface to the DMT radar system.

A user accesses the radar server via the client software to set the radar system parameters. After the radar system parameters are set, the radar server executes the RSLP system software, which can operate the RSLP system autonomously. For example, the radar server running the RSLP system software can coordinate the radar detection information received from other radar servers (e.g., radar units 715a-715n). In some embodiments, the RSLP system software is run on a computer which is also running DMT's client software. In yet other embodiments, the RSLP system software executes code or software codes from DMT's software development kit or from DMT's remote listener.

In some embodiments, wind farms include SCADA systems to control and to monitor the operation of individual turbines in the wind farm and the wind farm itself. The SCADA systems have an infrastructure where a Central Control Hub 730 communicates with each wind turbine 320. The SCADA system may include a communication infrastructure that includes wired (e.g., fiber-optic cables) and/or wireless communication links interconnecting the Central Control Hub 730 and the wind turbines 320. Often the fiber-optic cables are bundles of multiple individual fiber-optic strands. As illustrated in FIG. 7B, the RSLP system can use the SCADA's communications infrastructure (e.g., wired communication links) to pass control signals between the master radar detection processing unit 303 and the obstruction light controller units 724a-724n, which control the obstruction lights 322. The SCADA systems can also include wireless communication links between some elements of the system.

In operation, the master radar detection processing unit 303 running the RSLP software code transmits control signals to the obstruction light controller units 724a-724n over the SCADA infrastructure via interface module 705. As the radar units 715 scan the sky, the master radar detection processing unit 303 interprets the radar returns from the radar units 715 to determine whether the obstruction lights 322 should be turned on or off. If the master radar detection processing unit 303 determines that the obstruction lights 322 should be turned on or off, the master radar detection processing unit 303 sends a control signal to the obstruction light controller units 724a-724n via the interface module 705 and the SCADA Central Control Hub 730 to turn on or turn off the obstruction lights 322. In response to the control signal, the obstruction light controller units 724a-724n turn on or turn off the obstruction lights 322 on the wind turbines 320a-320n.

In some embodiments, each obstruction light 322 is an autonomous unit. Each obstruction light 322 may include its own photocell that controls operation of the obstruction light 322 based on ambient light. Each obstruction light 322 may also contain a GPS receiver so that all lights in a wind farm can flash synchronously based on GPS time coding. According to one embodiment, a single obstruction light controller unit 310 connects to a group of obstruction lights.

Figure 8A:
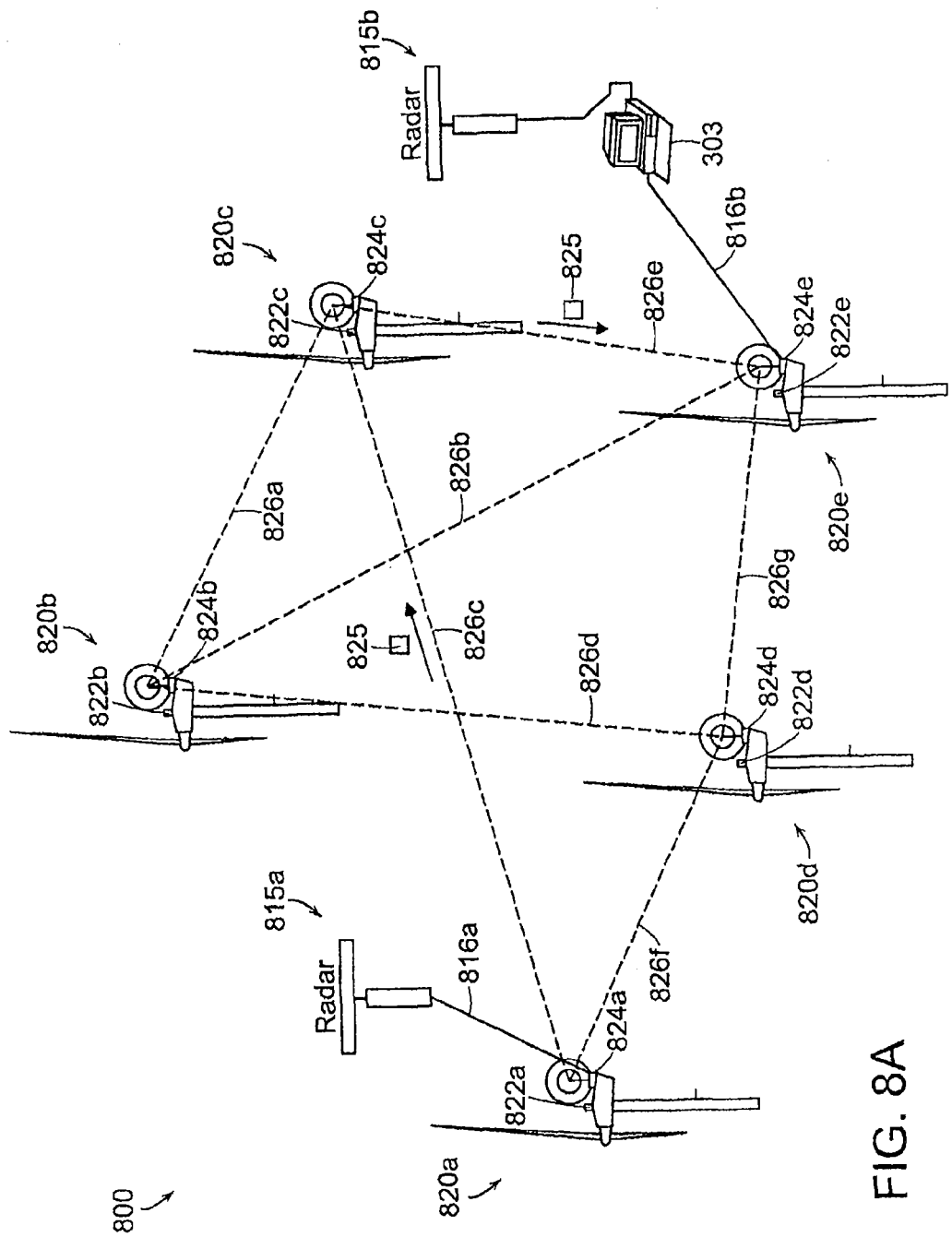
FIG. 8 is a block diagram of an RSLP system, according to another illustrative embodiment of the invention.
Figure 8B:
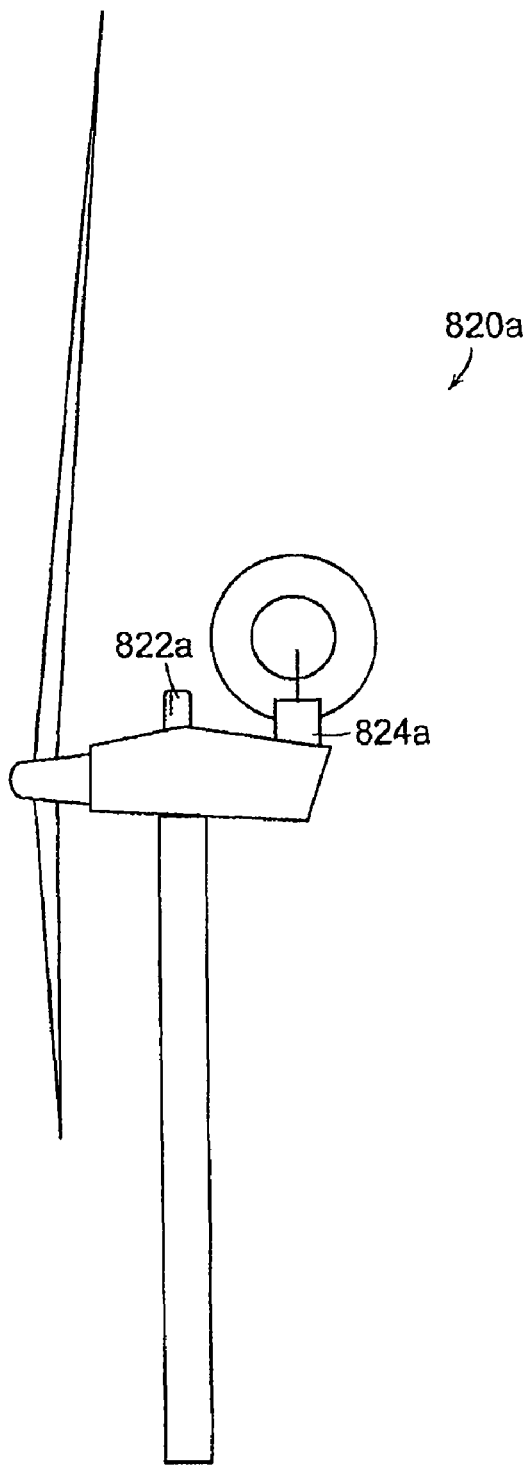

FIG. 8 is an RSLP system 800 including multiple obstruction light controller units 824a-824e (generally, 824) in a wireless network, according to an illustrative embodiment of the invention. The RSLP system 800 includes a plurality of wind turbines 820a-820e (generally, 820), a plurality of obstruction lights 822a-822e (generally, 822), a plurality of radar units 815a-815b (generally, 815), and a master radar detection processing unit 303. The radar units 815 monitor a volume containing the wind turbines 820. Each wind turbine 820 includes an obstruction light 822 and an obstruction light controller unit 824 that are electrically coupled together. Each obstruction light controller unit 824 includes a relay (e.g., the NC/SPDT relay 918 of FIG. 9) configured to turn the obstruction light 822 on or off. In some embodiments, the wind turbine 820 or other obstruction includes a plurality of obstruction lights electrically coupled to a single obstruction light controller unit 824.

As shown in FIG. 8, the plurality of obstruction light controller units 824 communicate via wireless communication links 826a-826g (generally, 826). In various embodiments, the obstruction light controller units 824 can communicate in an ad hoc, multi-hop, or wireless mesh network topology. In other embodiments the obstruction light controller units 824 communicate in a point-to-point, peer-to-peer, or point to multi-point network topology. In an embodiment incorporating a wireless mesh network topology, each obstruction light controller unit 824 receives, interprets and relays control messages to neighboring obstruction light controller units 824 which, in turn, receive, interpret and relay the same control messages. The multiple obstruction light controller unit nodes 824 form a wireless network so that control messages can reach every obstruction light controller unit 824.

The wireless network also provides the communication infrastructure for the coordination of the radar units 815 and for the coordination of the detection information generated by each radar unit's radar signal processing unit. For example, the radar unit 815a can relay a message with radar detection information to the master radar detection processing unit 303 via wired links 816a, 816b and the wireless network of obstruction light controller units 824. In some embodiments, the wired links 816a, 816b are wireless links.

In some embodiments, the master radar detection processing unit 303 is a computer collocated with radar unit 815b. The master radar detection processing unit 303 and the radar units 815 can be located in the vicinity of the monitored volume or located remotely from the monitored volume. All or a portion of the communication links between elements of the RSLP system may be wireless communication links. For example, any of the following communication links may be wireless communication links:

1. Communication links between the Obstruction Light Controller Units 824;
2. Communication links between the master radar detection processing unit 303 running the RSLP software and the Obstruction Light Controller Units 824;
3. Communication links between the radar units 815;
4. Communication links between the radar units 815 and the Obstruction Light Controller Units 824; and
5. Communication links between the radar units 815 and the master radar detection processing unit 303 running the RSLP software.

Through the relaying process, a message, such as a packet of wireless data, finds its way to various destinations in the RSLP system, passing through intermediate nodes with reliable communication links. Like the Internet and other peer-to-peer router-based networks, a mesh network offers multiple redundant communications paths throughout the network. If one link fails for any reason (including the introduction of strong RF interference), the network automatically routes messages through alternate paths. For example, obstruction light controller unit 824a may desire to send radar detection information from radar unit 815a to obstruction light controller unit 824e. If the communication link 826g is unreliable because, for example, the wireless module (e.g., the wireless module 914 of FIG. 9) in the obstruction light controller unit 824d is malfunctioning, then the obstruction light controller unit 824a may transmit a control message 825 to obstruction light controller unit 824e via communication links 826c and 826e. Accordingly, the mesh network embodiment of the RSLP system is self-healing because human intervention is not necessary for re-routing of control messages. Therefore, loss of one or more obstruction light controller units 824 does not necessarily affect the network's operation.

In a mesh network topology, the distance between obstruction light controller units 824 may be shortened to increase dramatically the communication link 826 quality. For example, additional obstruction light controller units 824 may be added to wind turbines in a wind farm to fill significant gaps in the network. If the distance between obstruction light controller units 824 is reduced by a factor of two, the resulting signal is at least four times more powerful at the receiving antenna (e.g., the antenna 915 of FIG. 9). This makes the communication links 826 more reliable without increasing transmitter power in individual obstruction light controller units 824. By adding more obstruction light controller units 824 to a wind farm and by using a mesh network topology, one can extend the reach, add redundancy, and improve the general reliability of the network. As a result, the mesh network topology may make the RSLP system robust and reliable.

In some embodiments, the mesh network architecture of an RSLP system is also self-organizing and does not require manual configuration. Because of this, adding a new obstruction light controller unit 824 or relocating an existing obstruction light controller unit 824 is as simple as plugging it in and turning it on. The network discovers the new obstruction light controller unit 824 and automatically incorporates it into the existing system. Thus, the RSLP system is highly adaptable.

The embodiment of the RSLP system employing a mesh network topology is also scalable and can handle hundreds of obstruction light controller units 824 installed on wind turbines 820 in a wind farm because the network's operation does not depend on a central control point. Thus, an RSLP system employing a mesh network is inherently reliable, adapts easily to environmental or architectural constraints, and can scale to handle hundreds of obstruction light controller units 824.

In various embodiments, the RSLP system can employ other network topologies including an ad hoc wireless network, a hybrid combination of the mesh network and ad hoc wireless network, a hybrid wireless/wired network. In these embodiments, a single obstruction light controller unit 824 operates as a network node, logic interpreter and relay controller of the obstruction lights. The multiple obstruction light controller units 824, with the possible addition of other nodes for routing, together make up the hardware portion of the RSLP system. Thus, embodiments of the RSLP system can send obstruction light control messages to multiple obstruction light controller units 824 at many locations over large geographic areas with potentially varying topography and with node-to-node distances varying from a few hundred meters to several kilometers.

In various embodiments, the obstruction light controller units can communicate with other obstruction light controller units via a wired network or a hybrid wired/wireless network. Also, the radar units can communicate with the master radar detection processing unit via a wired network or a hybrid wired/wireless network.

In some embodiments, not all turbines need to be lit when a wind farm is erected. The requirements vary from one wind farm to another based on layout. In the above-mentioned Jordanville wind farm, only 32 of the 68 total turbines needed to be lit. In other embodiments, all the turbines would be required to be lit to provide greater visibility than current FAA regulatory schemes.

Figure 9:
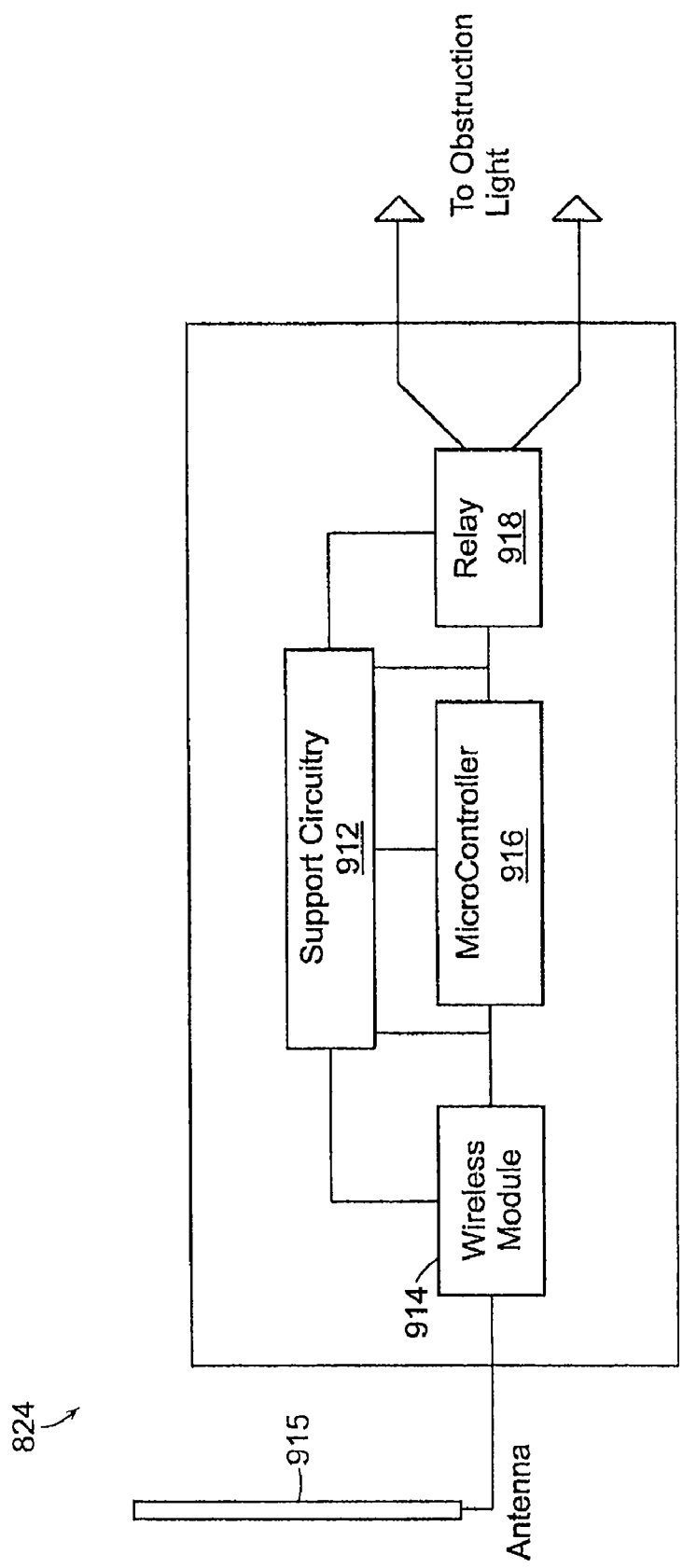
FIG. 9 is a block diagram of an obstruction light controller unit for an RSLP system, according to an illustrative embodiment of the invention.

FIG. 9 is a block diagram of an obstruction light controller unit 824 for an RSLP system, according to an illustrative embodiment of the invention. The obstruction light controller unit 824 includes an antenna 915, a wireless module 914, a microcontroller 916, a switching unit 918, and support circuitry 912. The switching unit 918 can include a normally closed (NC) relay or a single-pole-double-throw (SPDT) relay with normally closed leads. The support circuitry 912 may include, for example, power circuitry that provides regulated power to the obstruction light controller unit 824. The support circuitry 912 may also include IC chips, oscillators, resistors, capacitors, diodes, LEDs, and voltage regulators to support the basic functionality of the components of the obstruction light controller unit 824. The wireless module 914 handles all necessary communication and network protocol tasks. In the SCADA embodiment described above, the antenna 915 and the wireless module 914 are replaced by a communications hardware configured to receive wired communication signals.

In some embodiments, the obstruction light controller unit 824 is mounted atop the nacelle of a wind turbine of the wind farm as shown in FIG. 8. The obstruction lights on wind turbines are required by the FAA to flash at a specified rate. The obstruction light controller unit 824 may include the ability to control the timing of the flashing of the obstruction lights.

The obstruction light controller unit 824 serves as the interface between the master radar detection processing unit (e.g., the master radar detection processing unit 303 of FIG. 8) running the RSLP software code and the obstruction lights (e.g., the obstruction lights 822 of FIG. 8). In one embodiment, the antenna 915 and wireless module 914 are configured to receive control messages transmitted from a wireless transmitter (not shown) connected to the master radar detection processing unit running the RSLP software code. The obstruction light controller unit 824 then interprets the control signals via the microcontroller 916 and drives its relay 918 to turn on an associated obstruction light based on radar detection information indicating that one or more airborne vehicles have entered the volume monitored by a radar unit (e.g., the radar units 815a, 815b of FIG. 8) or based on the occurrence of a failure condition. The failure condition may include radar unit failure caused by power loss or communications failure caused by interference signals or a broken communications link. The obstruction light controller unit 824 interprets control signals and drives its relay 918 to turn off an associated obstruction light based on radar detection information that all airborne vehicles have left the volume monitored by the radar unit. The obstruction light controller unit 824 relays control signals to other obstruction light controller units 824 where the process of interpretation and relaying is repeated.

Thus, the obstruction light controller unit 824 receives and interprets signals from the master radar detection processing unit, which can be collocated with the radar unit 815b, to determine when to turn an associated obstruction light on or off. For example, the obstruction light controller unit 824 can be configured to receive and interpret signals indicating whether an aircraft is present within the monitored volume (e.g., AircraftPresent and AircraftNotPresent signals). The obstruction light controller unit 824 can also be configured to receive and interpret signals indicating whether all or a portion of the RSLP system has failed or is improperly functioning. For example, if components of the RSLP system are functioning properly, the obstruction light control nodes 824 may receive and interpret an Is Working signal sent from a computer running the RSLP system software code at a regular time interval. Otherwise, the obstruction light control nodes 824 may receive and interpret an Error mode signal sent from a computer running the RSLP system software code.

In one embodiment, the microcontroller 916 in each obstruction light controller unit 824 may control corresponding obstruction lights based on the signals received from the master radar detection processing unit 303 and according to the following logic:

|  | Is Working | Error mode |
| --- | --- | --- |
| AircraftPresent | Lights ON | Lights ON |
| AircraftNotPresent | Lights OFF | Lights ON |

The RSLP system is designed to be fail-safe. In one embodiment, if the radar units (e.g., the radar units 815a, 815b of FIG. 8), the RSLP system software, the radar unit software, or any other portion of the RSLP system fail for any reason, the RSLP system will revert to turning on the obstruction lights until the failure condition is resolved. In one embodiment, the obstruction light controller unit 824 provides a layer of protection in the case of radar failure, software failure, or a need to reboot the computer running the software component. For example, the obstruction light controller unit 824 may be configured to interpret the lack of an expected signal as an indication that all or a portion of the RSLP system has failed or is improperly functioning. In one embodiment, the obstruction light controller unit 824 continuously monitors for the Is Working signal to be received from the RSLP system software code. If this signal is not found within an expected time interval, it will assume that it has received a control signal to turn on an obstruction light from the RSLP system software code and it will turn the obstruction lights on. In some embodiments, the RSLP system software code or an obstruction light controller unit alerts an operator that there is a fault present in the RSLP system.

In some embodiments, the master radar detection processing unit 303 can determine if the radar units are working properly by operating the radar units to find the wind turbines at their known locations. Additionally, if the master radar detection processing unit 303 detects a failure of a obstruction light controller unit 824, it can generate a fault indication and transmit an error signal to the RSLP system components. The fault indications can be triggered by a lack of an acknowledgement signal from an obstruction light controller unit 824.

Each obstruction light controller unit 824 can include a timer. If an obstruction light controller unit 824 receives an Is Working signal, the timer is reset. If an Is Working signal is NOT received within an expected time period or an IsNotWorking signal is received, the hardware unit enters error mode. In error mode, the obstruction light controller unit automatically turns on the associated obstruction light. A received Is Working signal takes the obstruction light controller unit 824 out of error mode, and causes the timer to reset.

Figure 10:
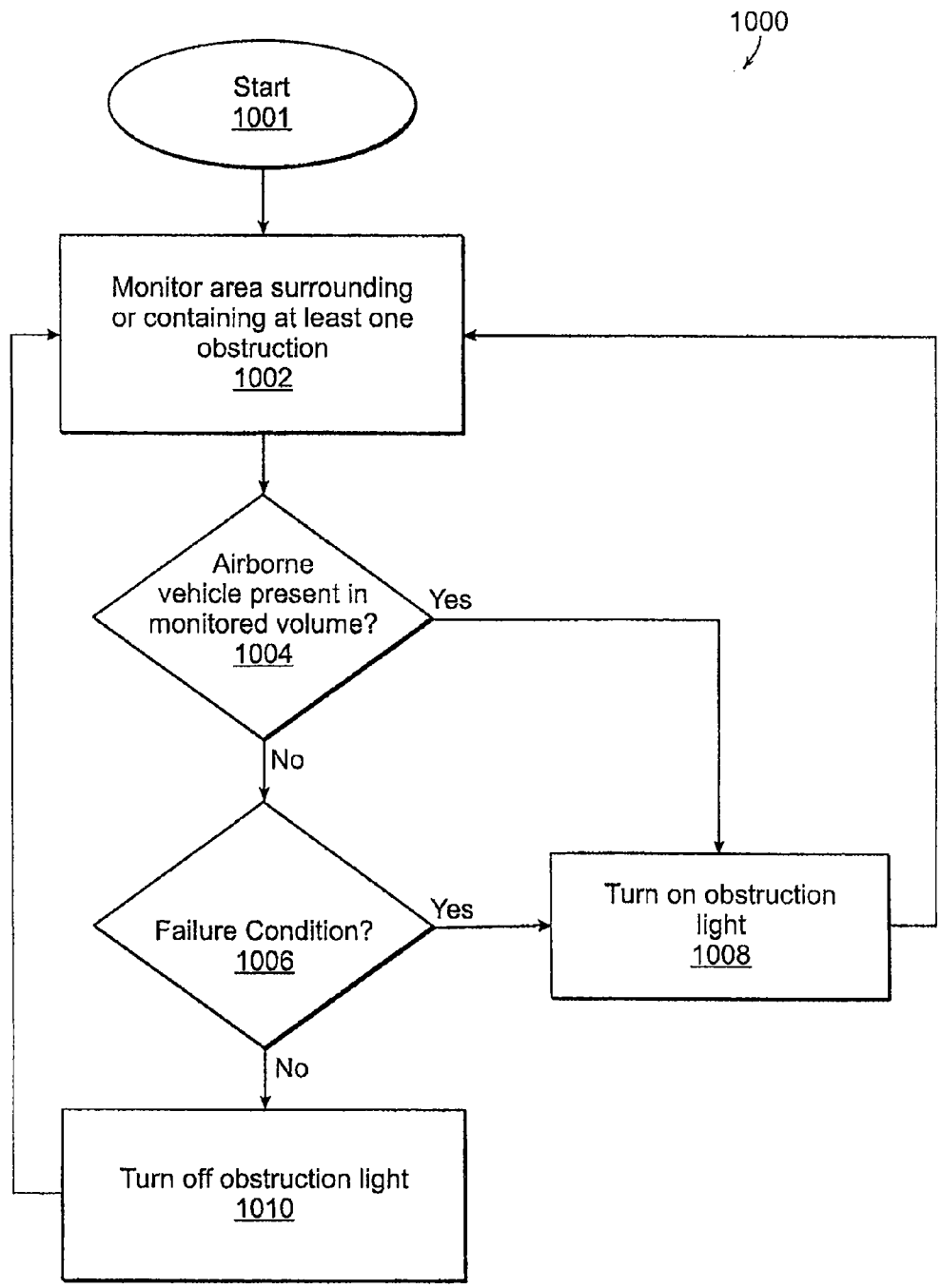
FIG. 10 is a flow diagram of a method for preventing light pollution, according to an illustrative embodiment of the invention.

FIG. 10 is a flow diagram of a method for preventing light pollution, according to an illustrative embodiment of the invention. After starting 1001, a volume surrounding or containing at least one obstruction is monitored 1002 (e.g., by the radar units 815a, 815b of FIG. 8). Next, it is determined whether an airborne vehicle is present in the monitored volume 1004 (e.g., by the master radar detection processing unit 303 of FIG. 8). If an airborne vehicle is present in the monitored volume, an obstruction light (e.g., the obstruction lights 822 of FIG. 8) is turned on 1008 (e.g., by the obstruction light controller unit 824 of FIG. 8) and the monitoring of the area surrounding or containing the at least one obstruction continues 1002. Otherwise, it is determined whether a failure condition exists 1006. If a failure condition exists, the obstruction light is turned on 1008 and the monitoring 1002 continues. If a failure condition does not exist, the obstruction light is turned off 1010 and the monitoring 1002 continues.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier interne protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for preventing light pollution, comprising:
a radar unit configured to monitor a volume surrounding or containing at least one obstruction, the at least one obstruction having one or more obstruction lights;
a master radar detection processing unit in communication with the radar unit, the master radar detection processing unit configured (a) to process radar detection information from the radar unit; (b) to determine whether a vehicle is present in the monitored volume; and (c) to generate and transmit one or more control signals based on the processed radar detection information; and
a network of obstruction light controller units in communication with the master radar detection processing unit for receiving the one or more control signals, each obstruction light controller unit configured (i) to turn on an obstruction light if at least one of the control signals indicates that the vehicle has entered the monitored volume or a failure condition has occurred and (ii) to turn off the obstruction light if at least one of the control signals indicates that the vehicle has left the monitored volume and the failure condition has not occurred.

2. The system of claim 1, further comprising a plurality of radar units in communication with the master radar detection processing unit via the network of obstruction light controller units, the plurality of radar units including the radar unit and configured to transmit radar detection information to the master radar detection processing unit via the network.

3. The system of claim 1, wherein the vehicle is an airborne vehicle and the master radar detection processing unit receives radar detection information from the radar unit and determines at least one of a presence of the airborne vehicle, a range of the airborne vehicle, an azimuth of the airborne vehicle, an elevation of the airborne vehicle, or any combination thereof.

4. The system of claim 3, wherein the master radar detection processing unit differentiates between airborne vehicles and ground vehicles.

5. The system of claim 3, wherein the airborne vehicle includes a small plane, a large plane, a helicopter, or a glider.

6. The system of claim 1, wherein the at least one obstruction includes a windmill, a wind turbine, or a tower.

7. The system of claim 6, wherein the master radar detection processing unit differentiates the vehicle from the motion of the wind turbine rotors and the variable yaw orientation of the wind turbine nacelles.

8. The system of claim 1, wherein the network of obstruction light controller units is a wireless network.

9. The system of claim 1, wherein the master radar detection processing unit monitors the operational status of the radar unit or a plurality of radar units.

10. The system of claim 1, wherein the radar unit is mounted on a wind turbine.

11. The system of claim 1, wherein the radar unit is located in close proximity to the monitored volume.

12. The system of claim 1, wherein the radar unit is located remotely from the monitored volume.

13. An obstruction light controller unit for preventing light pollution, comprising:
   a communications unit configured to receive one or more control signals from a master radar detection processing unit via a network, the master radar detection processing unit generating a control signal of the one or more control signals based on radar detection information from at least one radar unit, the at least one radar unit monitoring a volume surrounding or containing at least one obstruction having one or more obstruction lights;
   a processing unit configured (i) to interpret control signals indicating whether a vehicle is present in the monitored volume and (ii) to interpret control signals indicating whether a failure condition has occurred; and
   a switching unit configured (i) to turn on the one or more obstruction lights in response to the processing unit determining that a vehicle has entered the monitored volume or that the failure condition has occurred and (ii) to turn off the one or more obstruction lights in response to the processing unit determining that all vehicles have vacated the monitored volume and the failure condition has not occurred.

14. The obstruction light controller unit of claim 13, wherein the communications unit is a wireless communications unit that includes an antenna.

15. The obstruction light controller unit of claim 13, wherein the switching unit is a normally closed (NC) relay or a single-pole-double-throw (SPDT) relay with normally closed leads.

16. The obstruction light controller unit of claim 13, wherein the processing unit is further configured to monitor, within a regular time interval, for a predetermined control signal of the control signals indicating whether the failure condition has occurred.

17. The obstruction light controller unit of claim 13, wherein the processing unit is further configured to monitor, within a regular time interval, for a predetermined control signal of the control signals indicating that elements of a system for preventing light pollution are properly functioning and interpret not detecting, within the regular time interval, the predetermined signal as an occurrence of the failure condition.

18. A method for preventing light pollution, comprising:
   monitoring for vehicles in a volume surrounding or containing at least one obstruction, the at least one obstruction having at least one obstruction light;
   determining whether at least one vehicle is present in the monitored volume;
   determining whether a failure condition exists; and
   turning on at least one obstruction light in response to determining that (i) at least one vehicle is present in the monitored volume or (ii) a failure condition exists; and
   turning off the at least one obstruction light in response to determining that (i) no vehicles are present in the monitored volume and (ii) a failure condition does not exist.

19. The method of claim 18, wherein determining whether a failure condition exists includes monitoring, within a regular time interval, for a predetermined signal indicating whether elements of a system for preventing light pollution are properly functioning.

20. The method of claim 19, further comprising turning on at least one obstruction light in response to not detecting, within the regular time interval, a predetermined signal indicating that elements of the system for preventing light pollution are properly functioning.

21. The method of claim 18, further comprising turning on at least one obstruction light in response to detecting a predetermined signal indicating that elements of the system for preventing light pollution are not properly functioning.

22. The method of claim 18, further comprising determining at least one of a presence of an airborne vehicle, a range of the airborne vehicle, an azimuth of the airborne vehicle, an elevation of the airborne vehicle, or any combination thereof.

23. The method of claim 22, further comprising differentiating between airborne vehicles and ground vehicles.

24. The method of claim 18, wherein the at least one obstruction includes a windmill, a wind turbine, a tower, or any combination thereof.

25. The method of claim 24, further comprising differentiating a vehicle from the motion of the wind turbine rotors or the variable yaw orientation of the wind turbine nacelles.

\* \* \* \* \*